(12) United States Patent
Chen et al.

(10) Patent No.: US 10,583,773 B2
(45) Date of Patent: Mar. 10, 2020

(54) VEHICLE-MOUNTED SYSTEM AND VEHICLE

(71) Applicant: BOE TECHNOLOGY GROUP CO., LTD., Beijing (CN)

(72) Inventors: Yanshun Chen, Beijing (CN); Xiaodong Liu, Beijing (CN); Guanshan Tong, Beijing (CN); Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/072,304

(22) PCT Filed: Nov. 10, 2017

(86) PCT No.: PCT/CN2017/110481
§ 371 (c)(1),
(2) Date: Jul. 24, 2018

(87) PCT Pub. No.: WO2018/171211
PCT Pub. Date: Sep. 27, 2018

(65) Prior Publication Data
US 2019/0263317 A1    Aug. 29, 2019

(30) Foreign Application Priority Data
Mar. 23, 2017  (CN) .......................... 2017 1 0178977

(51) Int. Cl.
*B60Q 1/16*   (2006.01)
*B60Q 1/00*   (2006.01)
(Continued)

(52) U.S. Cl.
CPC ............. *B60Q 1/16* (2013.01); *B60Q 1/0023* (2013.01); *B60Q 1/0041* (2013.01); *B60Q 1/143* (2013.01);
(Continued)

(58) Field of Classification Search
CPC ........ B60Q 1/0408; B60Q 1/16; B60Q 1/503; B60Q 1/1438; B60Q 1/0023;
(Continued)

(56) References Cited

U.S. PATENT DOCUMENTS

| 7,661,856 | B2 | 2/2010 | Nakamura et al. |
| 2013/0258688 | A1* | 10/2013 | Kalapodas ............. B60Q 1/085 362/465 |

(Continued)

FOREIGN PATENT DOCUMENTS

| CN | 103723004 A | 4/2014 |
| CN | 106016130 A | 10/2016 |

(Continued)

OTHER PUBLICATIONS

International Search Report and Written Opinion dated Feb. 14, 2018.

*Primary Examiner* — Joseph L Williams
*Assistant Examiner* — Jose M Diaz
(74) *Attorney, Agent, or Firm* — Dilworth & Barrese, LLP; Michael J. Musella, Esq.

(57) ABSTRACT

A vehicle-mounted system and a vehicle are disclosed. The vehicle-mounted system includes a vehicle lamp system, the vehicle lamp system includes a direction changing unit or/and a light intensity adjusting unit and a vehicle lamp; the vehicle lamp is arranged on a front side of a vehicle body and configured to emit light; the direction changing unit is arranged on a light emergent side of the vehicle lamp, and configured to change a transmission direction of light that is incident on the direction changing unit and emitted by the vehicle lamp; and the light intensity adjusting unit is configured to adjust intensity of the light emitted by the vehicle lamp.

20 Claims, 7 Drawing Sheets

(51) Int. Cl.
   *B60Q 1/14* (2006.01)
   *B60Q 1/50* (2006.01)
   *G06K 9/00* (2006.01)
   *B60R 16/02* (2006.01)

(52) U.S. Cl.
   CPC .......... *B60Q 1/1438* (2013.01); *B60Q 1/503* (2013.01); *G06K 9/00791* (2013.01); *B60Q 2300/054* (2013.01); *B60Q 2300/056* (2013.01); *B60Q 2400/00* (2013.01); *B60R 16/02* (2013.01)

(58) Field of Classification Search
   CPC .............. B60Q 1/0041; B60Q 1/143; B60Q 2300/054; B60Q 2300/0556; B60Q 2400/00; B60Q 2300/41; B60Q 2300/42; B60Q 2300/056; G06K 9/00825; G06K 9/2027; G06K 9/6202; G06K 9/00791; B60R 16/02
   See application file for complete search history.

(56) References Cited

U.S. PATENT DOCUMENTS

| | | | |
|---|---|---|---|
| 2015/0009695 A1* | 1/2015 | Christmas | G03H 1/2249 362/466 |
| 2015/0070499 A1* | 3/2015 | Roelke | G03B 15/00 348/148 |
| 2016/0176335 A1* | 6/2016 | Hoshino | B60Q 1/143 362/466 |
| 2016/0377251 A1* | 12/2016 | Kim | G06K 9/00791 362/466 |
| 2017/0273159 A1* | 9/2017 | Akselrod | B60Q 1/143 |
| 2018/0022266 A1* | 1/2018 | Tzeng | B60Q 1/0408 362/466 |
| 2018/0058653 A1* | 3/2018 | Alisafaee | F21V 17/02 |
| 2018/0093604 A1* | 4/2018 | George | B60Q 1/0023 |
| 2018/0186278 A1* | 7/2018 | Song | B60Q 1/085 |
| 2018/0186279 A1* | 7/2018 | Chen | F21S 41/255 |

FOREIGN PATENT DOCUMENTS

| | | |
|---|---|---|
| CN | 106059611 A | 10/2016 |
| CN | 205800932 U | 12/2016 |
| CN | 107089182 A | 8/2017 |

\* cited by examiner

VEHICLE-MOUNTED SYSTEM AND VEHICLE

TECHNICAL FIELD

Embodiments of the present disclosure relate to a vehicle-mounted system and a vehicle.

BACKGROUND

In driving, vehicles often use safe driving components; for example, car users often use components such as vehicle lamps, rearview mirrors and the like during driving, but these components have significant safety hidden troubles.

For example, although the rearview mirrors can help a car driver to observe environment of a partial region (a visual region of the rearview mirror) around the vehicle body, if line of sight is blocked, the rearview mirrors cannot assist the car driver to observe environment in all positions around the vehicle body; that is, there is a visual blind region between visual regions of the rearview mirrors, and the above-mentioned visual blind region is one of main causes of a car accident.

For another example, when vehicle lamps of a vehicle behind the vehicle body emit strong light (for example, the rear vehicle turns on a high beam), the rearview mirrors inside the vehicle body may reflect some of the strong light into eyes of the driver, and the strong light not only affects mood of the driver, but also makes the eyes of the driver need to adapt to frequent switch between the strong light environment and the weak light environment, and thus makes the eyes of the driver easily tired, thereby increasing the possibility of accident.

For still another example, when two vehicles are meeting at night, in order to reduce interference of his or her own vehicle lamps on the other driver, each driver needs to timely switch high beam to low beam when the distance between the two vehicles to be met is relatively short; when the other vehicle has passed by, it is necessary to timely switch the low beam back to the high beam, so as to better observe a road ahead. However, the driver may be distracted by frequently switching between the high beam and the low beam, thereby reducing degree of driving safety. Therefore, there is a need for a vehicle-mounted system which can improve the driving safety.

SUMMARY

At least one embodiment of the present disclosure provides a vehicle-mounted system, comprising a vehicle lamp system, the vehicle lamp system includes a direction changing unit or/and a light intensity adjusting unit and a vehicle lamp; the vehicle lamp is arranged on a front side of a vehicle body and configured to emit light; the direction changing unit is arranged on a light emergent side of the vehicle lamp, and configured to change a transmission direction of light that is incident on the direction changing unit and emitted by the vehicle lamp; and the light intensity adjusting unit is configured to adjust intensity of the light emitted by the vehicle lamp.

For example, in the vehicle-mounted system according to at least one embodiment of the present disclosure, the vehicle lamp includes a left region, a middle region, and a right region; the vehicle lamp system further includes a first control unit, the first control unit being configured to control a transmission direction and/or intensity of the light emitted by the vehicle lamp by controlling the direction changing unit and/or the light intensity adjusting unit.

For example, in the vehicle-mounted system according to at least one embodiment of the present disclosure, the direction changing unit is at least configured to make the light emitted from the left region or the right region of the vehicle lamp respectively irradiate to a left front or a right front of the vehicle body.

For example, in the vehicle-mounted system according to at least one embodiment of the present disclosure, the direction changing unit is further configured to tilt the light emitted by the vehicle lamp downwards to a front lower side of the vehicle body.

For example, in the vehicle-mounted system according to at least one embodiment of the present disclosure, the vehicle lamp includes a first vehicle lamp and a second vehicle lamp; the first vehicle lamp is arranged on a left front side of the vehicle body, and includes the left region and a first middle region; the second vehicle lamp is arranged on a right front side of the vehicle body, and includes the right region and a second middle region; the middle region includes the first middle region and the second middle region; the direction changing unit includes a first direction changing unit and a second direction changing unit; the first direction changing unit is arranged on a light emergent side of the first vehicle lamp, and at least configured to change an emergent direction of the light emitted from the left region of the first vehicle lamp, so as to make the light emitted from the left region irradiate to a left front of the vehicle body; and the second direction changing unit is arranged on a light emergent side of the second vehicle lamp, and at least configured to change an emergent direction of the light emitted from the right region of the second vehicle lamp, so as to make the light emitted from the right region irradiate to the right front of the vehicle body.

For example, in the vehicle-mounted system according to at least one embodiment of the present disclosure, the first direction changing unit is further configured to make light emitted from the first middle region of the first vehicle lamp irradiate to a front of the vehicle body or make the light emitted from the first middle region tilt towards a right front side of the vehicle body, and an angle of the light emitted from the first middle region tilting towards the right front side of the vehicle body is less than 2 degrees; the second direction changing unit is further configured to make light emitted from the second middle region of the second vehicle lamp irradiate to a front of the vehicle body or make the light emitted from the second middle region tilt towards a left front side of the vehicle body, and an angle of the light emitted from the second middle region tilting towards the left front side of the vehicle body is less than 2 degrees.

For example, in the vehicle-mounted system according to at least one embodiment of the present disclosure, the vehicle lamp includes a front vehicle lamp, the front vehicle lamp being arranged in a middle region of the front side of the vehicle body, and including the left region, the middle region, and the right region; the direction changing unit is at least arranged on light emergent sides of the left region and the right region, and is at least configured to change emergent directions of light emitted from the left region and the right region, so as to make the light emitted from the left region and the right region respectively irradiate to a left front and a right front of the vehicle body.

For example, in the vehicle-mounted system according to at least one embodiment of the present disclosure, the vehicle lamp includes a front vehicle lamp, the front vehicle lamp being arranged in a middle region of the front side of the vehicle body, and including the left region, the middle region, and the right region; the direction changing unit including a lens, the lens being arranged on a light emergent side of the middle region and configured to collimate light emitted from the middle region, so as to make the light emitted from the middle region irradiate to a front of the vehicle body.

For example, in the vehicle-mounted system according to at least one embodiment of the present disclosure, the vehicle lamp system further includes an image acquiring unit and a processing unit; the image acquiring unit is arranged on a front side of the vehicle body, and configured to acquire images of other vehicles in front of the vehicle body and in a direction opposite to a moving direction of the vehicle body; the processing unit is configured to determine a distance between the vehicle body and another vehicle in front of the vehicle body and in a direction opposite to a moving direction of the vehicle body according to the images acquired by the image acquiring unit, and adjust an emergent direction and/or intensity of light emitted by the vehicle lamp by controlling the direction changing unit and/or the light intensity adjusting unit according to the distance.

For example, in the vehicle-mounted system according to at least one embodiment of the present disclosure, the vehicle lamp system further includes a vehicle lamp communication system, the vehicle lamp communication system including a signal transmitting module and a signal receiving module; the signal transmitting module includes a modulation module, and the modulation module being configured to modulate the vehicle lamp to load information over at least part of the light emitted by the vehicle lamp; the signal receiving module includes a photoelectric detection module and a demodulation module, the photoelectric detection module being configured to detect light intensity of visible light incident thereon, and the demodulation module being configured to acquire information loaded over the light detected by the photoelectric detection module.

For example, in the vehicle-mounted system according to at least one embodiment of the present disclosure, the light intensity adjusting unit includes light blocking walls arranged in an array and disposed on a light emergent side of the vehicle lamp.

For example, the vehicle-mounted system according to at least one embodiment of the present disclosure further comprises a dimming system, wherein the dimming system includes a first photoelectric sensing module and a transparent display panel; the first photoelectric sensing module is arranged on a rear window, and configured to detect light intensity of visible light incident on the first photoelectric sensing module; the transparent display panel is at least arranged in a partial region of the rear window, and configured to reduce a transmittance of the transparent display panel in a case that the light intensity of the visible light detected by the first photoelectric sensing module is greater than a light intensity threshold.

For example, in the vehicle-mounted system according to at least one embodiment of the present disclosure, the transparent display panel is further configured to display at least one of image, text, and symbol information.

For example, in the vehicle-mounted system according to at least one embodiment of the present disclosure, the dimming system further includes a second photoelectric sensing module; the second photoelectric sensing module is arranged on a side of the rear window close to an interior of the vehicle body, and configured to detect light intensity of visible light incident from a side of the rear window away from the interior of the vehicle body into the vehicle body through the rear window; the first photoelectric sensing module is arranged on a side of the rear window away from the interior of the vehicle body; the transparent display panel is configured to determine a transmittance of the transparent display panel according to signal intensity detected by the first photoelectric sensing module and signal intensity detected by the second photoelectric sensing module.

For example, in the vehicle-mounted system according to at least one embodiment of the present disclosure, the dimming system further includes a second control unit; the second control unit is configured to control a transmittance of the transparent display panel based on light intensity of visible light detected by the first photoelectric sensing module or/and the second photoelectric sensing module.

For example, the vehicle-mounted system according to at least one embodiment of the present disclosure further comprises a display system, wherein the display system includes an image acquiring device, an image display device, and a reflecting structure; the image acquiring device includes a first image acquiring device, a second image acquiring device and a third image acquiring device, the first image acquiring device, the second image acquiring device and the third image acquiring device being respectively configured to acquire images of a left rear side, a rear side and a right rear side of the vehicle body; the image display device is arranged in a position of an interior rearview mirror, and includes a first image display region, a second image display region and a third image display region, and the first image display region, the second image display region and the third image display region are respectively configured to display the images of the left rear side, the rear side and the right rear side of the vehicle body acquired by the first image acquiring device, the second image acquiring device and the third image acquiring device respectively; and the reflecting structure is arranged in at least a partial region of the second image display region, and configured to at least partially reflect visible light incident on the at least partial region.

For example, in the vehicle-mounted system according to at least one embodiment of the present disclosure, the reflecting structure covers an entire region of the second image display region, and the reflecting structure includes a partially-reflective partially-transmissive device.

For example, in the vehicle-mounted system according to at least one embodiment of the present disclosure, the reflecting structure covers a partial region of the second image display region, and the reflecting structure includes a high-reflection device, the high-reflection having a reflectance of greater than 99% to visible light.

For example, in the vehicle-mounted system according to at least one embodiment of the present disclosure, the display system further includes a third control unit; the third control unit is configured to make the second image acquiring device and the second image display region be in an operating state after receiving a start signal of the second image display region.

At least one embodiment of the present disclosure provides a vehicle, comprising the vehicle-mounted system according to any embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
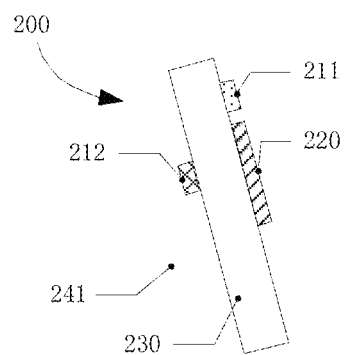
FIG. 1(a) is a side view of a dimming system provided by at least one embodiment of the present disclosure.
FIG. 1(b) is a side view of another dimming system provided by at least one embodiment of the present disclosure.
Figure 1:
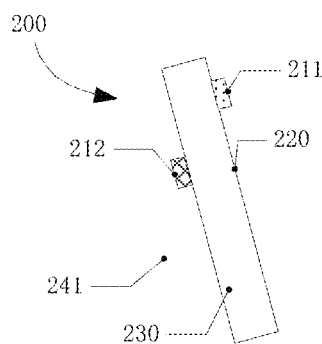

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide a vehicle-mounted system and a vehicle, and the vehicle-mounted system may be applied in driving a vehicle and may improve safety of driving the vehicle. The embodiments of the present disclosure specifically describe the embodiments by taking a car as a vehicle for an example, but the vehicle-mounted system provided by the embodiments of the present disclosure is not limited to being applied only to the car.

At least one embodiment of the present disclosure further provides a vehicle-mounted system, and the vehicle-mounted system comprises a vehicle lamp system. The vehicle lamp system includes a direction changing unit and/or a light intensity adjusting unit and a vehicle lamp; the vehicle lamp is arranged on a front side of the vehicle body and configured to emit light; the direction changing unit is arranged on a light emergent side of the vehicle lamp, and configured to change a transmission direction of light that is incident on the direction changing unit and emitted by the vehicle lamp; and the light intensity adjusting unit is configured to adjust intensity of the light emitted by the vehicle lamp. For example, according to actual application requirements, the vehicle lamp system may further include a first control unit, and the first control unit is configured to control a transmission direction and/or intensity of the light emitted by the vehicle lamp by controlling the direction changing unit and/or the light intensity adjusting unit.

For example, in the vehicle lamp system, the vehicle lamp is arranged on a front side of the vehicle body, and may include a left region, a middle region, and a right region. For example, the direction changing unit may be at least configured to make light emitted from the left region or the right region of the vehicle lamp respectively irradiate to a left front or a right front of the vehicle body; for another example, the direction changing unit may be further configured to tilt the light emitted by the vehicle lamp downwards a front lower side of the vehicle body; for still another example, the direction changing unit may further be configured to collimate light emitted from the middle region to make the light emitted from the middle region irradiate to the front of the vehicle body. For example, the light intensity adjusting unit may be implemented as a driving device of the vehicle lamp; for another example, the light intensity adjusting unit may further be implemented as a light blocking wall. For example, the first control unit may be configured to control a transmission direction and/or intensity of the light emitted by the vehicle lamp by controlling the direction changing unit and/or the light intensity adjusting unit (for example, a driving device of the vehicle lamp), thereby enhancing the driving safety.

For example, types, arrangement modes and adjustment modes of the vehicle lamp, the direction changing unit and the light intensity adjusting unit may be configured according to actual application requirements, which are not limited by the embodiments of the present disclosure, specifically. For example, the vehicle lamp may be a fluorescent lamp, a sodium lamp, a xenon lamp or the like, and may also include light emitting units arranged in an array. For example, the light emitting unit may be an organic light emitting diode or an inorganic light emitting diode (for example, an LED or a micro LED). Hereinafter, still another embodiment of the present disclosure is described in detail by taking an example that the vehicle lamp is the light emitting units arranged in an array, but the embodiments of the present disclosure are not limited thereto.

Figure 2:
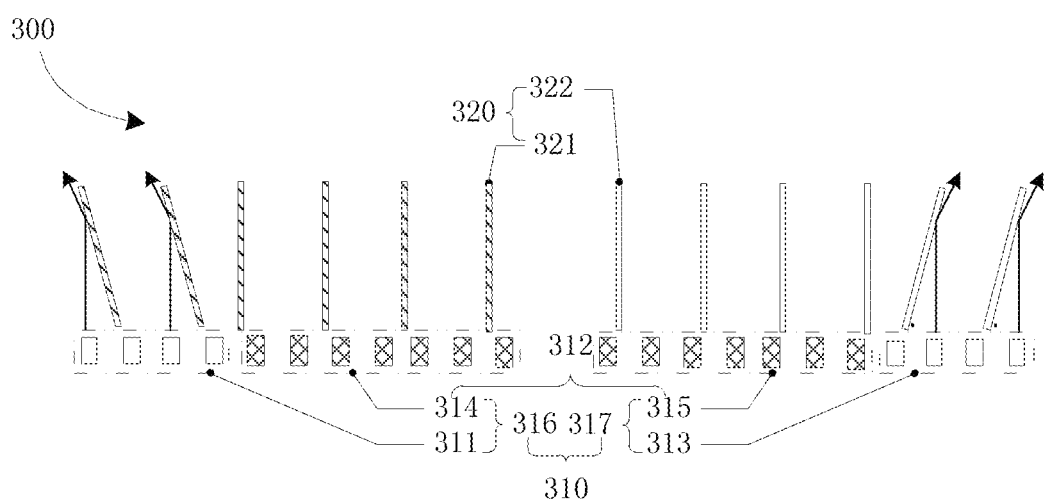
FIG. 2 is an exemplary structural diagram of a vehicle lamp system provided by at least one embodiment of the present disclosure.

For example, FIG. 2 is an exemplary structural diagram of a vehicle lamp system 300 provided by at least one embodiment of the present disclosure, and the vehicle lamp system illustrated in FIG. 2 is a plan view observed from above of the vehicle body, and row direction illustrated in FIG. 2 represents left and right directions of the vehicle body, small rectangular boxes arranged in the row direction illustrated in a lower part of FIG. 2 represent the light-emitting units. The vehicle lamp system 300 comprises a vehicle lamp 310, a direction changing unit 320 and a first control unit (not illustrated in FIG. 2).

For example, as illustrated in FIG. 2, the vehicle lamp 310 may include a first vehicle lamp 316 and a second vehicle lamp 317. For example, the first vehicle lamp 316 may be arranged on a left front side of the vehicle body, and include a left region 311 and a first middle region 314; the second vehicle lamp 317 may be arranged on a right front side of the vehicle body, and include a right region 313 and a second middle region 315; and the middle region 312 may include the first middle region 314 and the second middle region 315. For example, respective proportions of the left region 311 and the right region 313 in light emitting area of the first vehicle lamp 316 and the second vehicle lamp 317 may be less than 30% (for example, may be 20%), but the embodiments of the present disclosure are not limited thereto.

For example, as illustrated in FIG. 2, the direction changing unit 320 may include a first direction changing unit 321 and a second direction changing unit 322. For example, the first direction changing unit 321 may be arranged on a light emergent side of the first vehicle lamp 316, and at least configured to change an emergent direction of light emitted from the left region 311 of the first vehicle lamp 316, so as to make the light emitted from the left region 311 irradiate to a left front or a right front of the vehicle body; the second direction changing unit 322 may be arranged on a light emergent side of the second vehicle lamp 317, and at least configured to change an emergent direction of the light emitted from the right region 313 of the second vehicle lamp 317, so as to make the light emitted from the right region 313 irradiate to the right front or the left front of the vehicle body. For example, the direction changing unit 320 may be a grating. For another example, the first direction changing unit 321 and the second direction changing unit 322 may be reflectors (reflective mirrors), but the embodiments of the present disclosure are not limited thereto. Hereinafter, a vehicle lamp system 300 provided by still another embodiment of the present disclosure is described in detail by taking an example that the first direction changing unit 321 and the second direction changing unit 322 are the reflectors.

For example, at least one first direction changing unit 321 and at least one second direction changing unit 322 may be arranged on light emergent sides of the left region 311 of the first vehicle lamp 316 and the right region 313 of the second vehicle lamp 317, respectively. For example, one side of the first direction changing unit 321 arranged on the light emergent side of the left region 311 close to corresponding light emitting unit, may be arranged on a right side of the corresponding light emitting unit in a row direction, and one side of the second direction changing unit 322 arranged on the light emergent side of the right region 313 close to corresponding light emitting unit, may be arranged on a left side of the corresponding light emitting unit in the row direction (i.e., the right-left direction of the vehicle body). Therefore, the light emitted from the left region 311 may be irradiated to a left front of the vehicle body by tilting the first direction changing unit 321 arranged on the light emergent side of the left region 311 towards the left side of the vehicle body; and the light emitted from the right region 313 may be irradiated to a right front of the vehicle body by tilting the second direction changing unit 322 arranged on the light emergent side of the right region 313 towards the right side of the vehicle body, so that the vehicles to be met may be better observed. Alternatively, the light emitted from the left region 311 may be irradiated to a right front of the vehicle body by tilting the first direction changing unit 321 arranged on the light emergent side of the left region 311 towards the right side of the vehicle body; and the light emitted from the right region 313 may be irradiated to a left front of the vehicle body by tilting the second direction changing unit 322 arranged on the light emergent side of the right region 313 towards the left side of the vehicle body, so that the vehicles to be met may be not affected. In general, because respective proportions of the left region 311 and the right region 313 in light emitting area of the first vehicle lamp 316 and the second vehicle lamp 317 are small, the light of the left region 311 tilting towards the left side of the vehicle body and the light of the right region 313 tilting towards the right side of the vehicle body are not enough to affect the vehicles to be met.

For example, at least one first direction changing unit 321 and at least one second direction changing unit 322 may further be respectively arranged on light emergent sides of the first middle region 314 of the first vehicle lamp 316 and the second middle region 315 of the second vehicle lamp 317. For example, one side of the first direction changing unit 321 arranged on the light emergent side of the first middle region 314 close to corresponding light emitting unit, may be arranged on a left side of the corresponding light emitting unit in a row direction, and one side of the second direction changing unit 322 arranged on the light emergent side of the second middle region 315 close to corresponding light emitting unit, may be arranged on a right side of the corresponding light emitting unit in the row direction. In this way, the light emitted from the first middle region 314 may be irradiated to a right front of the vehicle body by tilting the first direction changing unit 321 arranged on the light emergent side of the first middle region 314 towards the right side of the vehicle body; and the light emitted from the second middle region 315 may be irradiated to a left front of the vehicle body by tilting the second direction changing unit 322 arranged on the light emergent side of the second middle region 315 towards the left side of the vehicle body. For example, an angle of the light emitted from the first middle region 314 tilting towards the right front side of the vehicle body and an angle of the light emitted from the second middle region 315 tilting towards the left front side of the vehicle body may be both less than 2 degrees. Thus, the driver may better observe a road directly in front of the vehicle body. Obviously, the first middle region 314 and the second middle region 315 may not be provided with the first direction changing unit 321 and the second direction changing unit 322, and at this time, the light emitted by the light emitting units of the first middle region 314 and the second middle region 315 may be irradiated to the front of the vehicle body at a certain divergence angle.

For example, as illustrated in FIG. 2, one first direction changing unit 321 and one second direction changing unit 322 may be arranged for every two light emitting units of the first vehicle lamp 316 and the second vehicle lamp 317. Obviously, the density of arranging the first direction changing unit 321 and the second direction changing unit 322 is not limited thereto. For example, one first direction changing unit 321 and one second direction changing unit 322 may be arranged for every light emitting unit of the first vehicle lamp 316 and the second vehicle lamp 317, respectively. For another example, one first direction changing unit 321 and one second direction changing unit 322 may be respectively arranged for every three light emitting units of the first vehicle lamp 316 and the second vehicle lamp 317. For still another example, one first direction changing unit 321 and one second direction changing unit 322 may be arranged for every light emitting unit of the left region 311 of the first vehicle lamp 316 and the right region 313 of the second vehicle lamp 317, and further one first direction changing unit 321 and one second direction changing unit 322 are arranged for every three light emitting units of the first middle region 314 of the vehicle lamp 316 and the middle region 312 of the second vehicle lamp 317.

For example, the first control unit may be configured to control an emergent direction and/or intensity of the light emitted by the vehicle lamp by controlling the direction changing unit and/or the light intensity adjusting unit. For example, the first control unit may be a central processor (e.g., an X86 processor, an ARM processor), a Programmable Logic Controller (PLC), a Digital Signal Processor (DSP) or the like.

For example, the vehicle lamp system provided by at least one embodiment of the present disclosure makes the light emitted from the left region and the right region respectively irradiate to a left front side and a right front side of the vehicle body by the direction changing unit, so that the driver can better observe the vehicles to be met under a premise that the vehicles to be met are not affected. In addition, the vehicle lamp system may make the light emitted from the first middle region and the second middle region irradiate towards front of the vehicle body by the direction changing unit, or slightly tilt to the right/left side of the vehicle body respectively, so that the driver may better observe a road directly in front of the vehicle body. As a result, safety of driving a vehicle equipped with the vehicle lamp system provided by at least one embodiment of the present disclosure is improved.

Figure 3:
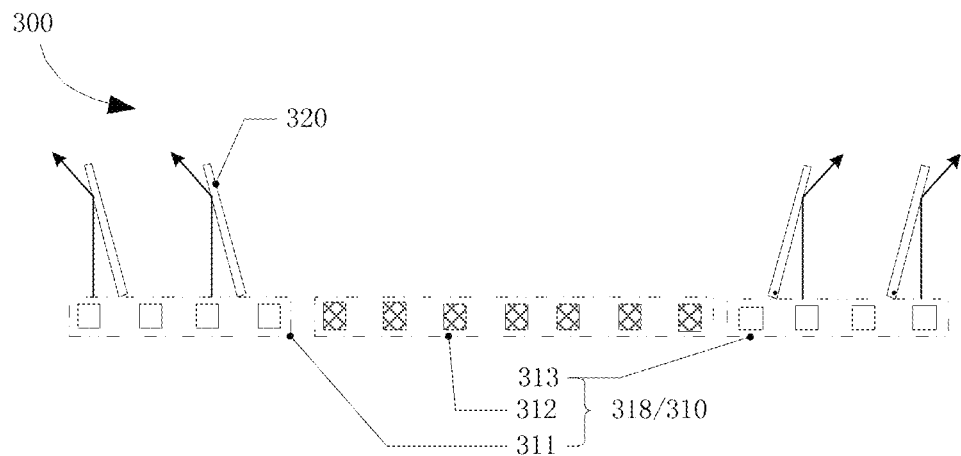
FIG. 3 is an exemplary structural diagram of another vehicle lamp system provided by at least one embodiment of the present disclosure.

For example, FIG. 3 is an exemplary structural diagram of another vehicle lamp system 300 provided by at least one embodiment of the present disclosure, and the vehicle lamp system illustrated in FIG. 3 is a plan view observed from above of the vehicle body, and row direction illustrated in FIG. 3 represents the left-right directions of the vehicle body, small rectangular boxes arranged in the row direction illustrated in a lower part of FIG. 3 represent the light-emitting units. The vehicle lamp system 300 comprises a vehicle lamp 310, a direction changing unit 320 and a first control unit (not illustrated in FIG. 2).

For example, as illustrated in FIG. 3, the vehicle lamp 310 may include a front vehicle lamp 318. For example, the front vehicle lamp 318 may be arranged on a middle region in the front side of the vehicle body, and include the left region 311, a middle region 312 and a right region 313. For example, respective proportions of the left region 311 and the right region 313 in light emitting area of the front vehicle lamp 318 may both be 10%, but the embodiments of the present disclosure are not limited thereto.

For example, as illustrated in FIG. 3, the direction changing unit 320 may be arranged on light emergent sides of the left region 311 and the right region 313, and at least configured to change emergent directions of the light emitted from the left region 311 and the right region 313, so as to make the light emitted from the left region 311 and the right region 313 respectively irradiate to a left front or a right front of the vehicle body. For example, the density of arranging the direction changing unit 320 may be configured according to actual application requirements, which is not limited by the embodiments of the present disclosure, specifically.

For example, at least one direction changing unit 320 may be arranged on the light emergent sides of the left region 311 and the right region 313, respectively. For example, a side of the direction changing unit 320 arranged on the light emergent side of the left region 311 close to corresponding light emitting unit, may be arranged on a right side of the corresponding light emitting unit in a row direction, and a side of the direction changing unit 320 arranged on the light emergent side of the right region 313 close to corresponding light emitting unit, may be arranged on a left side of the corresponding light emitting unit in the row direction. Therefore, the light emitted from the left region 311 may be irradiated to a left front of the vehicle body by tilting the direction changing unit 320 arranged on the light emergent side of the left region 311 towards the left side of the vehicle body; and the light emitted from the right region 313 may be irradiated to a right front of the vehicle body by tilting the direction changing unit 320 arranged on the light emergent side of the right region 313 towards the right side of the vehicle body, so that the vehicles to be met may be better observed without affecting the vehicles to be met.

For example, according to actual application requirements, the direction changing unit 320 may further be arranged on a light emergent side of the middle region 312, so as to control an emergent direction of the light emitted by the light emitting unit in the middle region 312. In this way, the driver may better observe a road ahead.

For example, the first control unit may be configured to control an emergent direction and/or intensity of the light emitted by the vehicle lamp by controlling the direction changing unit and/or the vehicle lamp. For example, the first control unit may be a central processor (e.g., an X86 processor, an ARM processor), a Programmable Logic Controller (PLC), a Digital Signal Processor (DSP) or the like.

For example, the other vehicle lamp system provided by at least one embodiment of the present disclosure makes light emitted from the left region and the right region respectively irradiate to a left front side and a right front side of the vehicle body by the direction changing unit, so that the driver may better observe the vehicles to be met without affecting the vehicles to be met. In addition, the vehicle lamp system may further control an emergent direction of the light emitted from the middle region by the direction changing unit, so that the driver may better observe a road ahead. As a result, the driving safety of a vehicle equipped with the other vehicle lamp system provided by at least one embodiment of the present disclosure is improved.

Figure 4:
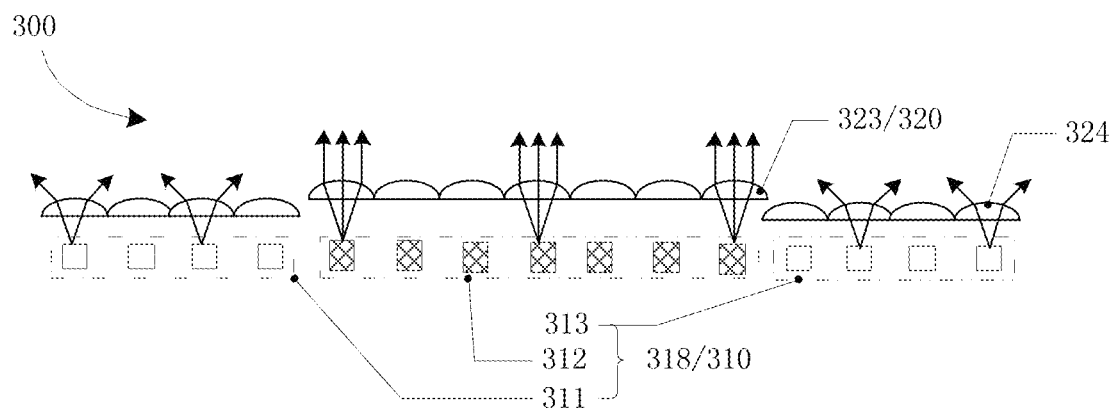
FIG. 4(a) is an exemplary structural diagram of still another vehicle lamp system provided by at least one embodiment of the present disclosure.
FIG. 4(b) is an exemplary cross-sectional view of a liquid crystal lens array.
FIG. 4(c) is another exemplary structural diagram of still another vehicle lamp system provided by at least one embodiment of the present disclosure.
Figure 4:
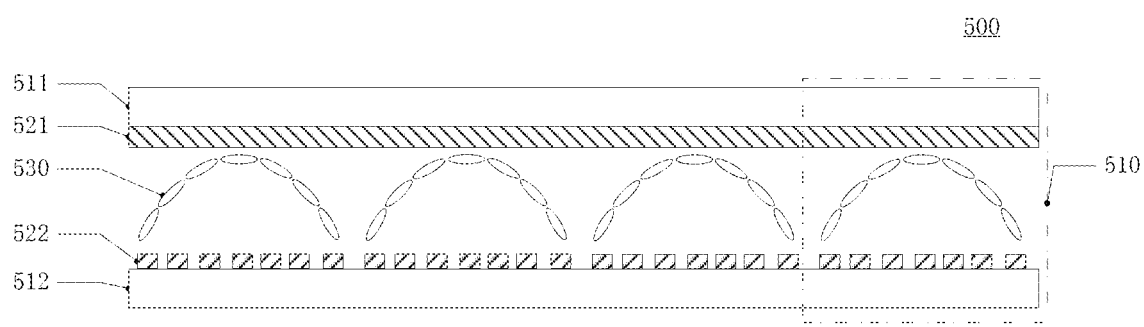
Figure 4:
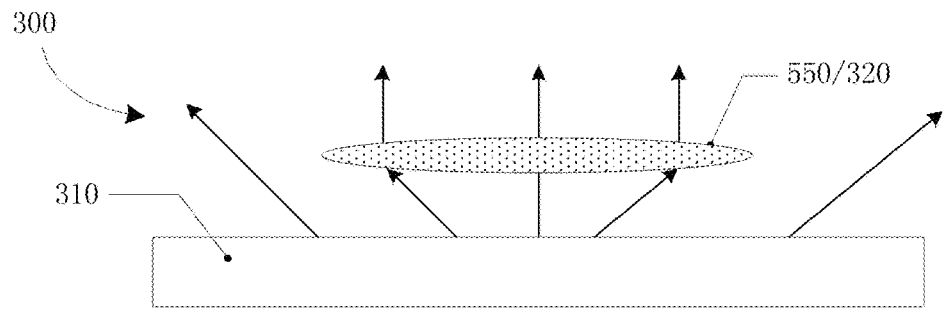

For example, FIG. 4 is an exemplary structural diagram of still another vehicle lamp system 300 provided by at least one embodiment of the present disclosure, and the vehicle lamp system illustrated in FIG. 4 is a plan view observed from above of the vehicle body, and row direction illustrated in FIG. 4 represents left and right directions of the vehicle body, small rectangular boxes arranged in the row direction illustrated in a lower part of FIG. 4 represent the light-emitting units. The vehicle lamp system 300 comprises a vehicle lamp 310, a direction changing unit 320 and a first control unit (not illustrated in FIG. 2).

For example, as illustrated in FIG. 4(a), the direction changing unit 320 may include a lens, and for example, the direction changing unit 320 may be a lens array 323 composed of lenses arranged in an array. For example, specific form of the lens array 323 may be configured according to actual application requirements, which is not specifically limited by the embodiments of the present disclosure. For example, as illustrated in FIG. 4(a), the lens array 323 may be arranged on a light emergent side of the middle region 312, and for example, each lens unit of the lens array 323 may respectively correspond to one of the light emitting units arranged in an array. For example, the light emitting unit may be arranged at a focal point of the lens array 323. For example, the lens array 323 may be configured to collimate the light emitted from the middle region 312, so that the light emitted from the middle region 312 is directly incident in front of the vehicle body, and thus the driver may better observe a road directly in direct front of the vehicle body.

For example, the vehicle lamp system 300 may further comprise a diffusion module 324. For example, the diffusion module 324 may be arranged on light emergent sides of the left region 311 and the right region 313, and configured to increase a divergence angle of light emitted from the left region 311 and the right region 313. For example, the diffusion module 324 may include a lens array respectively arranged on the left region 311 and the right region 313, and light emitting units of the left region 311 and the right region 313 are arranged on a side of a focal point of corresponding lens array close to the lens array, so that the lens array arranged on the light emergent sides of the left region 311 and the right region 313 may expand a divergence angle of the light emitted from the left region 311 and the right region 313, and thus the driver may better observe the vehicles without affecting the vehicles to be met.

For example, brightness levels of a vehicle lamp may be controlled by controlling the amount of lamps which are lit. For another example, the brightness levels of the vehicle lamp may further be controlled by controlling a magnitude of a driving current for driving the vehicle lamp, so that the intensity of the light emitted by the vehicle lamp can be adjusted.

For example, the direction changing unit 320 may further be a liquid crystal lens array 500, and as illustrated in FIG. 4(b), the liquid crystal lens array 500 includes a first substrate 511 and a second substrate 512 opposite to each other and a liquid crystal layer 530 therebetween. For each liquid crystal lens unit 510, for example, a planar electrode 521 is arranged on the first substrate 511, and for example, strip electrodes 522 are arranged on the second substrate 512. At least part of these strip electrodes 522 may be applied with different voltages respectively, so as to drive liquid crystal molecules have different deflecting degrees to obtain lens units having different diopters.

Obviously, the direction changing unit 320 provided by the embodiment of the present disclosure is not limited to a lens array composed of lenses arranged in an array. For example, as illustrated in FIG. 4(c), in a case where the lamp 310 is a fluorescent lamp, a sodium lamp, a xenon lamp or the like, a single lens 550 (for example, a lenticular lens) may be arranged to collimate the light emitted from the middle region of the vehicle lamp, so that the light emitted from the middle region may be incident directly in front of the body.

For example, the first control unit may be configured to control an emergent direction and/or intensity of the light emitted by the vehicle lamp by controlling the direction changing unit and/or the vehicle lamp. For example, the first control unit may be a central processor (e.g., an X86 processor, an ARM processor), a Programmable Logic Controller (PLC), a Digital Signal Processor (DSP) or the like.

For example, the still another vehicle lamp system provided by at least one embodiment of the present disclosure makes the light emitted from the middle region irradiate directly in front of the vehicle body by the direction changing unit, so that the driver may better observe a road ahead the vehicle body. In addition, the vehicle lamp system may further expand a divergence angle of the light emitted from the left region and the right region by the diffusion module arranged on the left region and the right region, so that the driver may better observe the vehicles to be met without affecting the vehicles to be met. As a result, the safety of driving a vehicle equipped with the still other vehicle lamp system provided by at least one embodiment of the present disclosure is improved.

For example, for the lamp system 300 illustrated in FIG. 2, FIG. 3, FIG. 4(a) to FIG. 4(c), the direction changing unit 320 may further be configured to make the light emitted by the vehicle lamp 310 tilt towards a front lower side of the vehicle body. For example, with respect to the lamp system 300, as illustrated in FIGS. 2 and 3, may make the light emitted by the vehicle lamp 310 towards a lower side of the vehicle body by tilting corresponding reflector (e.g., a reflecting surface of the reflector) toward the lower side of the vehicle body. As a result, it is possible to reduce influence of the light on the vehicles to be met when the vehicles are meeting, and it is possible to control a distance of near and far light (for example, a distance of irradiation or transmission of the light emitted by the vehicle lamp).

For example, adjustment modes of the light emitted by the direction changing unit 320 and/or the vehicle lamp 310 may be selected according to actual application requirements, which are not specifically limited by the embodiment of the present disclosure. For example, a driver may send an adjustment instruction to an adjusting mechanism of the direction changing unit 320 and/or the vehicle 310 to adjust the light emitted by the direction changing unit 320 and/or the vehicle lamp 310 based on the judgment of the distance between the vehicles to be met. For another example, in order to further improve the driving safety, the lamp system 300 provided by at least one embodiment of the present disclosure may include an image acquiring unit (e.g., a CCD or CMOS camera) and a processing unit (e.g., a Digital Signal Processor, etc.). For example, the image acquiring unit may be arranged on a front side of the vehicle body, and configured to acquire images of other vehicles in front of the vehicle body and in a direction opposite to a moving direction of the vehicle body. For example, the processing unit may determine the distance to the other vehicles in front of the vehicle body and in a direction opposite to a moving direction of the vehicle body according to the images acquired by the image acquiring unit. For example, two image acquiring units may be arranged on the front side of the vehicle body, and the two image acquiring units may take two photos of the vehicles to be met at a same time, and the processing unit may determine a distance to the vehicle to be met at different time points of taking the two photos based on the two photos and the binocular stereoscopic vision ranging technology, so that the processing unit may control the direction changing unit 320 and adjust the light emergent direction of the vehicle lamp 310 according to the distance, and thus automatic adjustment of the light emergent direction of the vehicle lamp 310 may be realized, and in this way the driving safety may be further improved. In addition, the processing unit may also control the light intensity adjusting unit according to the distance (for example, the light intensity adjusting unit may be a driving circuit for controlling light intensity of lights emitted by the vehicle lamp) to adjust the light intensity of the light emitted by the vehicle lamp.

Figure 11:
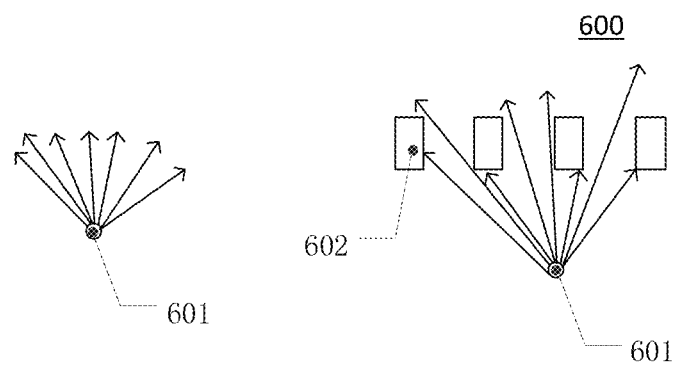
FIG. 11(a) is an exemplary structural diagram of still another vehicle lamp system provided by at least one embodiment of the present disclosure.
FIG. 11(b) is another exemplary structural diagram of still another vehicle lamp system provided by at least one embodiment of the present disclosure.
FIG. 11(c) is still another exemplary structural view of still another vehicle lamp system provided by at least one embodiment of the present disclosure.
FIG. 11(d) is yet another exemplary structural diagram of still another vehicle lamp system provided by at least one embodiment of the present disclosure.
Figure 11:
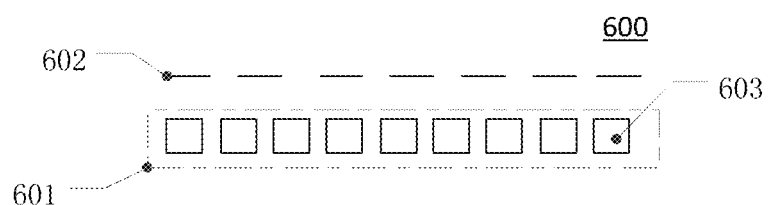
Figure 11:
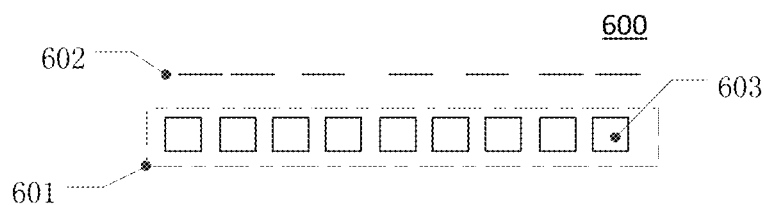
Figure 11:
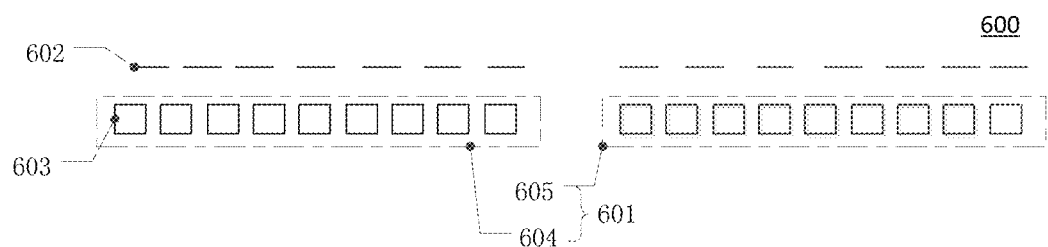

For example, FIG. 11(a) is an exemplary structural diagram of still another vehicle lamp system 600 provided by at least one embodiment of the present disclosure. For example, the vehicle lamp system 600 may include a vehicle lamp 601 and light blocking walls 602 (i.e., a light intensity adjusting unit) arranged in an array, and the light blocking walls 602 are arranged on the light emergent side of the vehicle lamp 601. It can be clearly seen from FIG. 11(a) that the light blocking walls can block part of the light emitted by the vehicle lamp 601, and thus intensity of the emergent light of the vehicle lamp system 600 may be adjusted, and the driving safety can be improved.

For example, the vehicle lamp 601 is not limited to a point light source illustrated in FIG. 11(a), and may further be the light emitting units 603 arranged in an array as illustrated in FIG. 11(b). For example, the intensity of the light emitted by the vehicle lamp system 600 may further be adjusted by controlling a spacing between two adjacent light blocking walls 602. For example, the intensity of light emitted by the vehicle lamp system 600 may be reduced by reducing the spacing between the two adjacent light blocking walls 602.

For example, arrangement methods of the light blocking walls 602 are not limited to the method illustrated in FIG. 11(a) where the spacing between any two adjacent light blocking walls 602 is equal, for example, the spacing between two adjacent light blocking walls may further be set in an unequal form.

For example, in a case where the vehicle lamp 601 is arranged directly in front of the vehicle body, the light blocking walls 602 may be arranged in a form illustrated in FIG. 11(c), that is, a spacing between the light blocking walls 602 corresponding to the left and right sides of the vehicle lamp 601 is less than a spacing between the light blocking walls 602 corresponding to the middle region of the vehicle lamp 601, so that influence of the light emitted by the vehicle lamp system 600 on the vehicles to be met on both sides of the vehicle body, and thus the driving safety can be improved.

For another example, in a case where the vehicle lamp 601 includes the left side vehicle lamp 604 and the right side vehicle lamp 605 arranged on the front left side and the front right side of the vehicle body, the light blocking walls 602 may be arranged in a form illustrated in FIG. 11(d), i.e., a spacing between the light blocking walls 602 corresponding to the left region of the left side vehicle lamp 604 is less than a spacing between the light blocking walls 602 corresponding to the middle region and the right region of the left side vehicle lamp 604, and a spacing between the light blocking walls 602 corresponding to the right region of the right side vehicle lamp 605 is less than a spacing between the light blocking walls 602 corresponding to the middle region and the left region of the right side vehicle lamp 605, so that influence of the light emitted by the vehicle lamp system 600 on the vehicles to be net on both sides of the vehicle body, and thus the driving safety can be improved.

Figure 5:
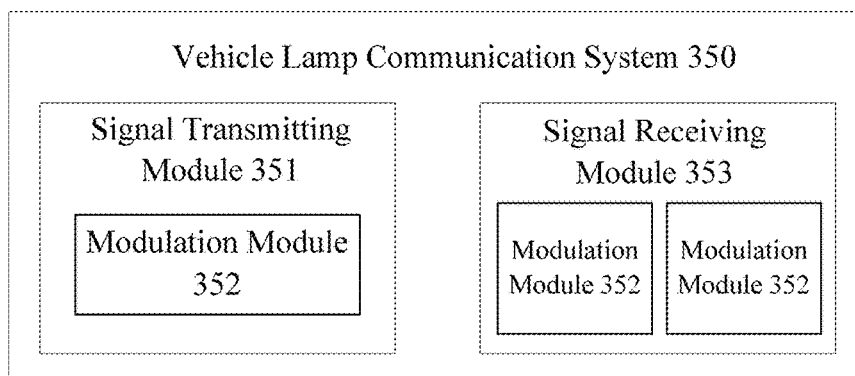
FIG. 5(a) is an exemplary structural diagram of a vehicle lamp communication system provided by at least one embodiment of the present disclosure.
FIG. 5(b) is an exemplary application scenario of the vehicle lamp communication system illustrated in FIG. 5(a)
Figure 5:
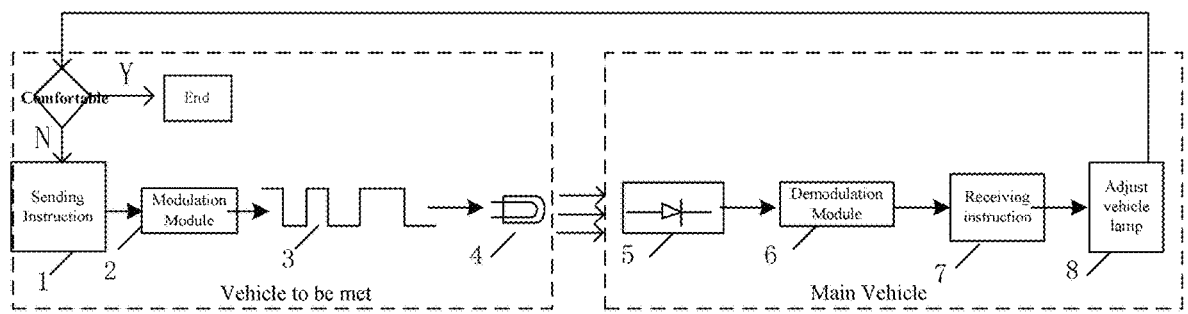

For example, as illustrated in FIG. 5(a), according to actual application requirements, the vehicle-mounted system provided by at least one embodiment of the present disclosure may comprise a vehicle lamp communication system 350, to remind the vehicles to be met to adjust the light emitted by the vehicle lamp 310 by using the vehicle lamp communication, or, to receive an adjustment request for the light emitted by the vehicle lamp 310 sent by the vehicle to be met. For example, the vehicle lamp communication system 350 may be applied to the vehicle lamp systems 300 illustrated in FIG. 2, FIG. 3, FIG. 4(a) to FIG. 4(c) and FIG. 11(a) to FIG. 11(d), or applied to other vehicles including light emitting units arranged in an array.

For example, the vehicle lamp communication system 350 may include a signal transmitting module 351 and a signal receiving module 353; the signal transmitting module 351 may include a modulation module 352, and the modulation module 352 may be configured to modulate the vehicle lamp 310, so as to load information over at least part of the light emitted by the vehicle lamp; the signal receiving module 353 may include a photoelectric detection module 354 and a demodulation module 355, the photoelectric detection module 354 may be configured to detect light intensity of visible light incident thereon, and the demodulation module may be configured to acquire information loaded over the light detected by the photoelectric detection module 354. For example, arrangement modes of the modulation module 352, the photoelectric detection module 354 and the demodulation module 355 may be referred to existing visible light communication system, for example, may be implemented by corresponding circuits, which will not be described here.

For example, FIG. 5(b) shows an exemplary application scenario of the vehicle lamp communication system illustrated in FIG. 5(a). For example, as illustrated in FIG. 5(b), in a case where a main vehicle causes discomfort to eyes of the driver of the vehicle to be met, there may be performed the following operations:

1. Sending a vehicle lamp adjustment request instruction by a driver of the vehicle to be met;

2. Transmitting the vehicle lamp adjustment request instruction to the modulation module of the vehicle to be met;

3. Converting the instruction signal into an electrical signal by the modulation module of the vehicle to be met;

4. Loading the instruction information on at least part of the light emitted by the vehicle lamp of the vehicle to be met by driving the vehicle lamp of the vehicle to be met through the electric signal generated by the modulation module of the vehicle to be met;

5. Receiving optical signal loaded with the vehicle lamp adjustment request instruction of the vehicle to be met and converting the optical signal into an electrical signal by the photoelectric detection module arranged on the main vehicle;

6. Receiving the electrical signal and demodulating the vehicle lamp adjustment request instruction signal loaded on the electrical signal by the demodulation module of the main vehicle;

7. Receiving the vehicle lamp adjustment request instruction signal demodulated by the demodulation module by the main vehicle;

8. Adjusting the vehicle lamp by the main vehicle, for example, adjusting the vehicle lamp by a driver of the host vehicle or automatically adjusting the vehicle lamp by the main vehicle. For example, adjusting an emergent direction of at least part of the light emitted by the vehicle lamp and/or intensity of the light emitted by the vehicle lamp.

For example, the vehicle lamp communication system provided by at least one embodiment of the present disclosure may make the driver of the vehicle to be met transmit the vehicle lamp adjustment request to a counterpart vehicle when feeling the vehicle lamp of the counterpart vehicle dazzling, thereby further improving the safety of driving the vehicle equipped with the vehicle lamp communication system provided by at least one embodiment of the present disclosure.

A vehicle-mounted system provided by at least one embodiment of the present disclosure may further include a dimming system. For example, the dimming system includes a first photoelectric sensing module and a transparent display panel. For example, according to actual application requirements, the dimming system may further include a second control unit. For example, the dimming system may be independently applied in a vehicle or applied in combination with the vehicle lamp system described above.

For example, in the dimming system, the first photoelectric sensing module is arranged on a rear window, and configured to detect light intensity of visible light incident on the first photoelectric sensing module. For example, the second control unit is configured to control a transmittance of the transparent display panel 220 based on the light intensity of the visible light detected by the first photoelectric sensing module. For example, the transparent display panel at least is arranged in a partial region of the rear window, to change the transmittance under the control of the second control unit; for example, the second control unit may be configured to reduce a transmittance of the transparent display panel when the light intensity of the visible light detected by the first photoelectric sensing module is greater than a light intensity threshold; for another example, the second control unit may further be configured to increase a transmittance of the transparent display panel when the light intensity of the visible light detected by the first photoelectric sensing module is less than the light intensity threshold For example, FIG. 1(a) is a side view of a dimming system 200 provided by at least one embodiment of the present disclosure. For example, as illustrated in FIG. 1(a), the dimming system 200 may include a first photoelectric sensing module 211, a transparent display panel 220 and a second control unit (not illustrated in the diagram).

For example, the first photoelectric sensing module 211 may be arranged on a rear window 230 and configured to detect light intensity of visible light incident on the rear window 230. For example, the transparent display panel 220 may be arranged on the rear window 230 and configured to reduce the transmittance of the transparent display panel 220 when the light intensity of the visible light detected by the first photoelectric sensing module 211 is greater than the light intensity threshold. Therefore, the dimming system 200 provided by one embodiment of the present disclosure may reduce the intensity of light incident in the vehicle body 241 and the intensity of the light reflected into eyes of the driver in the vehicle when the light intensity of the visible light incident on the rear window 230 is too strong, so that the driving safety can be improved.

For example, types and arrangement modes of the transparent display panel 220 may be configured according to actual application requirements, which are not specifically limited by the embodiments of the present disclosure. For example, the transparent display panel 220 may include at least one of a liquid crystal display panel, an OLED display panel, and an electrochromic display panel.

For example, as illustrated in FIG. 1(a), the transparent display panel 220 may be arranged in at least a partial region of the rear window 230, and for example, the transparent display panel 220 may be arranged in a position corresponding to a position of the interior rearview mirror, which may further reduce the intensity of light reflected in the eyes of the driver in the vehicle and further improve the driving safety. For another example, as illustrated in FIG. 1(b), the transparent display panel 220 may further be arranged in entire region of the rear window 230 or may use the transparent display panel 220 as a rear window.

For example, the first photoelectric sensing module 211 may be arranged according to actual application requirements, which is not limited by the embodiment of the present disclosure specifically. For example, as illustrated in FIG. 1(a), the first photoelectric sensing module 211 may be arranged on a side of the rear window 230 away from an interior 241 of the vehicle body. For another example, the first photoelectric sensing module 211 may further be arranged on a side of the rear window 230 close to the interior 241 of the vehicle body.

For example, the light intensity threshold may be configured according to actual application requirements, which is not specifically limited by the embodiment of the present disclosure. For example, the light intensity value that makes eyes of a driver comfortable may be determined as a light intensity threshold by testing. For another example, the light intensity threshold may further be configured according to an empirical value of a comfortable light intensity value for human eyes.

For example, in a case where the light intensity of the visible light detected by the first photoelectric sensing module 211 is greater than the light intensity threshold, a method for reducing the transmittance of the transparent display panel 220 and the reduction amount may be determined according to actual application requirements, which is not limited by the embodiments of the present disclosure specifically.

For example, in a case where the first photoelectric sensing module 211 is arranged on a side of the rear window 230 away from the interior 241 of the vehicle body, a magnitude of the transmittance of the transparent display panel 220 needs to be reduced may be determined by the proportion of the predetermined light intensity value that makes the eyes of the driver comfortable and the light intensity detected by the first photoelectric sensing module 211, the transmittance of the transparent display panel 220 may be quickly adjusted at this moment. For another example, in a case where the first photoelectric sensing module 211 is arranged on a side of the rear window 230 close to the interior 241 of the vehicle body, whether the transmittance of the transparent display panel 220 is needed to be continuously reduced by determining whether the light intensity value detected by the first photoelectric sensing module 211 is greater than the predetermined light intensity value that makes eyes of the driver comfortable, because the light intensity detected by the first photoelectric sensing module 211 is the light intensity of the interior 241 of the vehicle body, the above arrangement modes may make the light intensity in the vehicle closer to the light intensity that makes the eyes of the driver comfortable.

For example, the second control unit may be configured to control the transmittance of the transparent display panel based on the light intensity of the visible light detected by the first photoelectric sensing module. For example, the second control unit may be a central processor (e.g., an X86 processor, an ARM processor), a Programmable Logic Controller (PLC), a Digital Signal Processor (DSP) and the like.

For example, in order to more finely adjust the intensity of light reflected from reflecting members in the vehicle into the eyes of the driver, the dimming system 200 may further include a second photoelectric sensing module 212, and the second photoelectric sensing module 212 may be arranged on a side of the rear window close to interior of the vehicle body, and configured to detect light intensity of visible light passing the rear window. At this time, the first photoelectric sensing module 211 is arranged on a side of the rear window 230 away from the interior 241 of the vehicle body, and configured to detect the light intensity of the visible light incident on the rear window 230.

For example, the transparent display panel 220 may determine a transmittance of the transparent display panel 220 according to signal intensity detected by the first photoelectric sensing module 211 and signal intensity detected by the second photoelectric sensing module 212. For example, a magnitude of the transmittance of the transparent display panel 220 needs to be reduced may be determined by a proportion of the predetermined light intensity value that makes eyes of the driver comfortable and the light intensity detected by the first photoelectric sensing module 211, and thus the light intensity of the interior 241 of the vehicle body may be reduced rapidly; then the transmittance of the transparent display panel 220 may be finely adjusted based on the signal intensity detected by the second photoelectric sensing module 212 and the light intensity value that makes the eyes of the driver comfortable, so as to make the light intensity inside the vehicle closer to the light intensity value that makes the eyes of the driver comfortable.

For another example, the transmittance of the transparent display panel 220 may further be adjusted on a basis of an absolute value of a difference between the light intensity L1 detected by the first photoelectric sensing module 211 and the light intensity L2 detected by the second photoelectric sensing module 212. For example, the transmittance of the transparent display panel 220 may be adjusted in a case of |L2−L1|>=M0, so as to make |L2−L1|<M0 after adjusting the transparent display panel 220, wherein when the light intensity exceeds M0, human eyes obviously feels uncomfortable. For example, in a case of |L2−L1|>=M0, the transmittance of the transparent display panel 220 is decreased by x %, and the adjusted light intensity is that, Lx=L2(1−x %), in order to make the light intensity satisfy |Lx−L1|<M0, i.e., L2(1−x %)−L1<M0, x must satisfy a condition of: x %>(L2−(L1+M0))/L2, i.e., the transmittance of the vehicle window needs to be automatically reduced to not less than (L2−(L1+M0))/L2, so that e the driver may not feel dizziness.

For example, the transparent display panel 220 may further be configured to display at least one of image, text, and symbol information. For example, the transparent display panel 220 may display text or symbol information (for example, "Newbie") before the vehicle changes lanes or decelerates, to remind the rear vehicle to pay attention to a distance, thereby further improving the driving safety.

For example, a vehicle-mounted system provided by an embodiment of the present disclosure may improve driving safety by reducing a light intensity reflected in a driver's eyes by reducing a transmittance of a dimming system and/or by displaying safety information.

For example, according to actual application requirements, the vehicle-mounted system provided by at least one embodiment of the present disclosure may further comprise a display system. For example, the display system includes an image acquiring device, an image display device, and a reflecting structure. For example, the display system may further include a third control unit according to actual application requirements. The display system may be independently applied in a vehicle or may be applied in combination with the dimming system or/and the vehicle lamp system described above.

For example, in the display system, the image acquiring device includes a first image acquiring device, a second image acquiring device, and a third image acquiring device, and the first image acquiring device, the second image acquiring device, and the third image acquiring device are respectively configured to acquire images of a left, front and right rear sides of the vehicle body; the image display device is arranged in a position of an interior rearview mirror, and includes a first image display region, a second image display region and a third image display region, and the first image display region, the second image display region and the third image display region are respectively configured to display the images of the left, front and right rear sides of the vehicle body acquired by the first image acquiring device, the second image acquiring device and the third image acquiring device; the reflecting structure is arranged in at least a partial region of the second image display region, and configured to at least partially reflect visible light incident on the at least partial region; and the third control unit is configured to make the second image acquiring device and the second image display region be in an operating state after receiving start signal of the second image display region.

Figure 6:
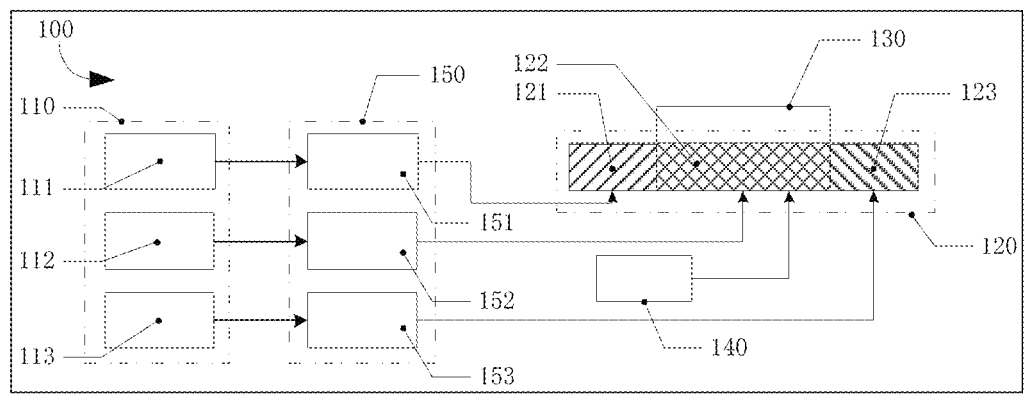
FIG. 6 is an exemplary structural diagram of a display system provided by still another embodiment of the present disclosure.

For example, FIG. 6 is an exemplary structural diagram of a display system 100 provided by at least one embodiment of the present disclosure. For example, as illustrated in FIG. 6, the vehicle-mounted system 10 includes a display system 100, and the display system 100 includes an image acquiring device 110, an image display device 120, a reflecting structure 130 and a third control unit 140.

For example, the image acquiring device 110 may include a first image acquiring device 111, a second image acquiring device 112, and a third image acquiring device 113. For example, a type of the image acquiring device 110 may be configured according to actual application requirements, which is not specifically limited by the embodiment of the present disclosure. For example, the image acquiring device 110 may be a CCD type or CMOS type camera and so on, may be a visible light camera, or may include an infrared light camera and the like.

For example, the image acquiring device 110 may be specifically arranged according to actual application requirements, which is not specifically limited by the embodiment of the present disclosure. For example, FIGS. 7(a) and 7(b) show an arrangement mode of the image acquiring device 110, and FIGS. 7(a) and 7(b) respectively show exemplary front view and left view of a vehicle equipped with the display system 100 provided by at least one embodiment of the present disclosure.

Figure 7:
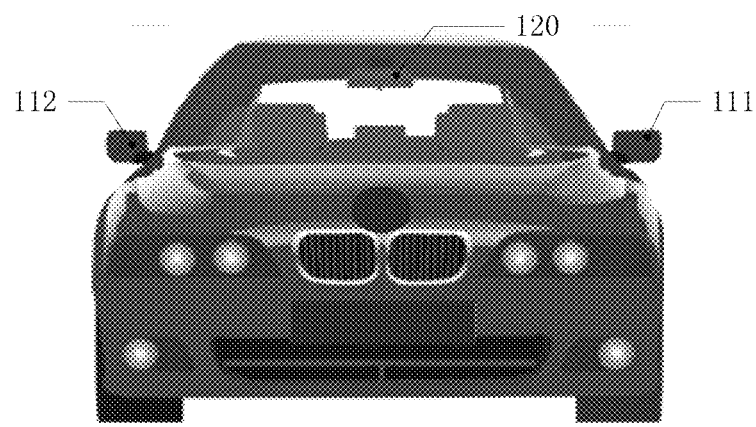
FIG. 7(a) is an exemplary front view of a vehicle equipped with a display system provided by still another embodiment of the present disclosure.
FIG. 7(b) is an exemplary left side view of the vehicle illustrated in FIG. 7(a)
Figure 7:
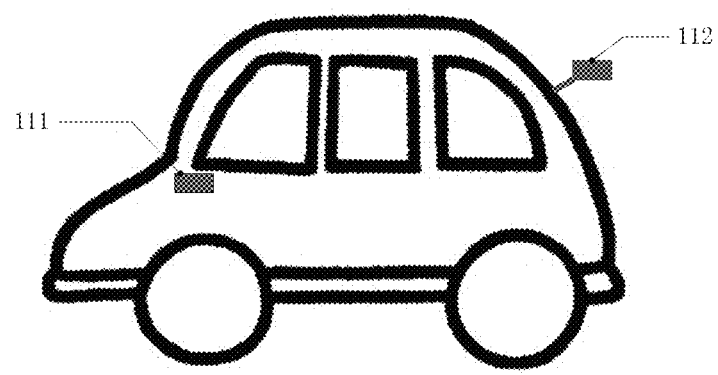

For example, as illustrated in FIGS. 7(a) and 7(b), the first image acquiring device 111 may be arranged in a position where the left side rearview mirror is originally located on the left side of the vehicle body, and the second image acquiring device 112 may be arranged on a rear side of the vehicle body, and the third image acquiring device 113 is arranged in a position where the right side rearview mirror is originally located on the right side of the vehicle body, and thus the first image acquiring device 111, the second image acquiring device 112, and the third image acquiring device 113 may acquire images of a left, front and right rear sides of the vehicle body, respectively. For example, since the first image acquiring device 111 and the third image acquiring device 113 may implement functions of the existing left and right rearview mirrors of the vehicle body, the vehicle provided with the display system 100 provided by the embodiment of the present disclosure may not need to be provided with a left side rearview mirror and a right side rearview mirror.

For example, the arrangement mode of the image acquiring device 110 of the embodiments of the present disclosure is not limited to the cases illustrated in FIGS. 7(a) and 7(b). For example, according to actual application requirements, the first image acquiring device 111 may further be arranged on a side close to a front portion of the vehicle body where the left side rearview mirror has been originally located on the left side of the vehicle body. The third image acquiring device 113 may be arranged on a side close to a front portion of the vehicle body where the right side rearview mirror has been originally located on the right side of the vehicle body.

For example, according to actual application requirements, the image acquiring device 110 may further include a fourth image acquiring device and a fifth image acquiring device, and the fourth image acquiring device and the fifth image acquiring device may be distributedly arranged in middle regions of the left and right sides of the vehicle body, so that a range of images acquired by the image acquiring device 110 is increased, and thereby the driving safety is improved.

For example, according to actual application requirements, the image acquiring device 110 may further include a component (such as a pan-tilt) having a capability of adjusting angle (e.g., left and right adjustment or/and up/down adjustment), so that a range of images acquired by the image acquiring device 110 is increased, and thereby the driving safety is improved.

For example, the image display device 120 may be arranged in a position where an interior rearview mirror is located and include a first image display region 121, a second image display region 122, and a third image display region 123. The first image display region 121, the second image display region 122, and the third image display region 123 may be respectively configured to display the images of the left, front and right rear sides of the vehicle body acquired by the first image acquiring device 111, the second image acquiring device 112 and the third image acquiring device 113.

For example, by integrating the functions of the left side rearview mirror and the right side rearview mirror on the image display device 120 arranged in the position of the rearview mirror in the vehicle, a driver of a vehicle only needs to observe the image display device arranged in one position to obtain information of environment around the vehicle body, thereby avoiding distracting the driver's attention, further improving the driving safety.

For example, the first image display region 121, the second image display region 122 and the third image display region 123 of the image display device 120 may be arranged according to actual application requirements, which are not specifically limited by the embodiment of the present disclosure. For example, FIG. 8(a) and FIG. 8(b) show a plan schematic diagram and a cross-sectional schematic diagram of a structure of an image display device 120 of a display system 100 provided by at least one embodiment of the present disclosure, and the cross-sectional schematic diagram illustrated in FIG. 8(b) is taken along a line A-A' illustrated in FIG. 8(a).

Figure 8:
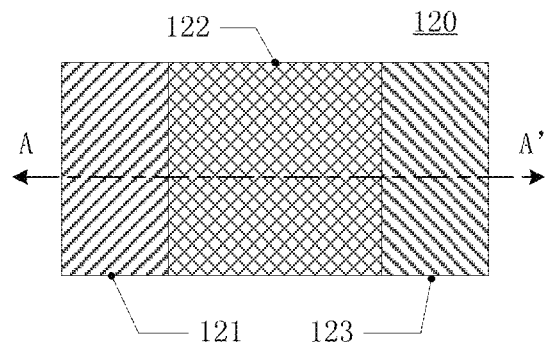
FIG. 8(a) is an exemplary plan view of an image display device of a display system provided by at least one embodiment of the present disclosure.
FIG. 8(b) is a cross-sectional schematic diagram of the image display device illustrated in FIG. 8(a) along a line A-A'.
Figure 8:
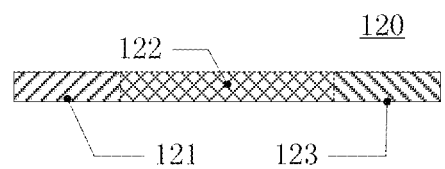

For example, as illustrated in FIGS. 8(a) and 8(b), the first image display region 121, the second image display region 122, and the third image display region 123 may be arranged from left to right, sequentially. Obviously, the embodiments of the present disclosure are not limited thereto.

For example, in a case where the image acquiring device 110 further includes a fourth image acquiring device and a fifth image acquiring device, the image display device 120 may further include a fourth image display area region and a fifth image display region. For example, the fourth image display region and the fifth image display region may be arranged on a left side of the first image display region 121 and a right side of the third image display region 123, respectively, and it is obvious that the embodiments of the present disclosure are not limited thereto.

For example, the first image display region 121, the second image display region 122 and the third image display region 123 may each correspond to one display screen. For another example, the first image display region 121, the second image display region 122 and the third image display region 123 may correspond to a same display screen. For still another example, the first image display region 121 and the third image display region 123 may correspond to a same display screen, and the second image display region 122 may correspond to a display screen, which is not specifically limited by the embodiments of the present disclosure.

For example, the type of the display screen of the image display device 120 may be selected according to actual application requirements, which is not specifically limited by the embodiment of the present disclosure. For example, the display screen of the image display device 120 may be at least one of a Liquid Crystal Display (LCD), an Organic Light Emitting Display (OLED), a Plasma Display Panel (PDP), or a Light Emitting Diode (LED) and an Electrophoretic Display Panel (EPD). For example, a shape of display screen of the image display device 120 may be a rectangle as illustrated in FIG. 7(a), or may be other shapes such as an ellipse or a circle. For example, the display screen of the image display device 120 may be a non-flexible hard display screen or a flexible display screen.

For example, the display system 100 may further include a reflecting structure 130, and the reflecting structure 130 may be arranged in at least a partial region of the second image display region 122, and configured to at least partially reflect visible light incident on the at least partial region. For example, the reflecting structure 130 may be arranged according to actual application requirements specifically, which is not specifically limited by the embodiments of the present disclosure.

Figure 9:
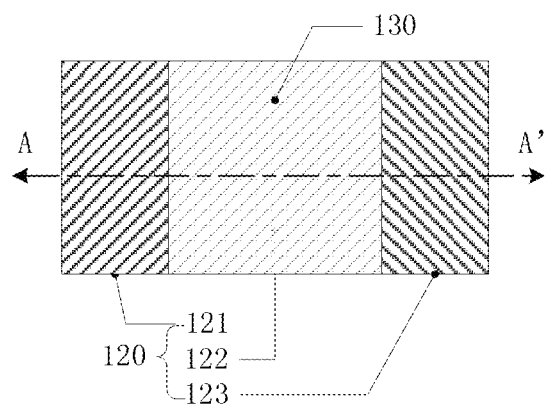
FIG. 9(a) is an exemplary plan view of a reflecting structure of a display system provided by at least one embodiment of the present disclosure.
FIG. 9(b) is a cross-sectional schematic diagram of the reflecting structure illustrated in FIG. 9(a) along the line A-A'.
Figure 9:
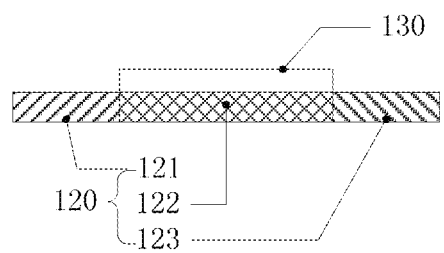

For example, FIG. 9(a) and FIG. 9(b) show a plan schematic diagram and a cross-sectional schematic diagram of a reflecting structure 130 of an image display device 120 of a display system 100 provided by at least one embodiment of the present disclosure, and the cross-sectional schematic diagram illustrated in FIG. 9(b) is taken along an line A-A' illustrated in FIG. 9(a).

For example, as illustrated in FIGS. 9(a) and 9(b), the reflecting structure 130 may entirely cover the second image display region 122, and the reflecting structure 130 includes a partially-reflecting partially-transmitting device. Herein, part of the light emitted by the second image display region 122 may be transmitted through the partially-reflecting partially-transmitting device and transmitted to eyes of a driver, and part of environmental light incident on a rear side of the vehicle body of the partially-reflecting partially-transmitting device may be reflected to the eyes of the driver through the partially-reflecting partially-transmitting device. Therefore, the driver may use the light reflected by the partially-reflecting partially-transmitting device to observe environment on a rear side of the vehicle body in the case of high visibility outside the vehicle (for example, in a sunny day); and may use the second image acquiring device 112 and the second image display region 122 of the image display device 120 to better observe the environment on the rear side of the vehicle body in the case of low visibility outside the vehicle (for example, rain or snow or night). Thus, the display system 100 provided by the still another embodiment of the present disclosure may save power consumption of the image display device 120 while ensuring the driving safety.

For example, a type of the partially-reflecting partially-transmitting device and a reflectance of the partially-reflecting partially-transmitting device to visible light may be selected according to actual application requirements. For example, the partially-reflecting partially-transmitting device may include at least one of a multilayer film composite structure, a discontinuous aluminum evaporation coating film, a discontinuous tin evaporation coating film, and a liquid crystal film material. For example, the partially-reflecting partially-transmitting device may have a reflectance of 30% to 70% to the visible light. For example, the partially-reflecting partially-transmitting device may have a reflectance of 40%, 50%, or 60% to the visible light.

Figure 10:
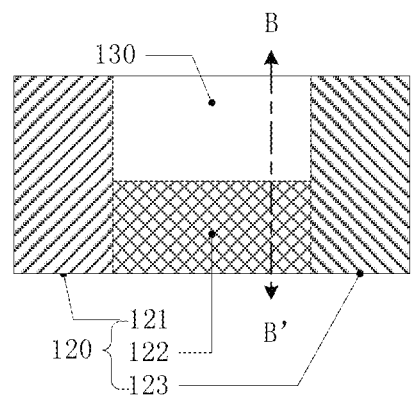
FIG. 10(a) is an exemplary plan view of another reflecting structure of a display system provided by at least one embodiment of the present disclosure.
FIG. 10(b) is a cross-sectional schematic diagram of the reflecting structure illustrated in FIG. 10(a) along a line B-B'.
Figure 10:
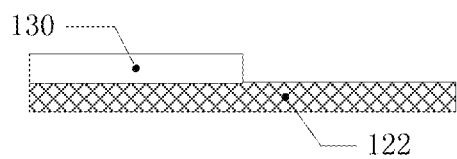

For example, FIG. 10(a) and FIG. 10(b) show a plan schematic diagram and a cross-sectional schematic diagram of another reflecting structure 130 of an image display device 120 of a display system 100 provided by at least one embodiment of the present disclosure, and the cross-sectional schematic diagram illustrated in FIG. 10(b) is taken along a line B-B' illustrated in FIG. 10(a). For example, as illustrated in FIGS. 10(a) and 10(b), the reflecting structure may cover a partial region of the second image display region 122 (e.g., an upper part of the second image display region 122). For example, the reflecting structure 130 may include a high-reflection device. For example, the high-reflection device having a reflectance of greater than 99% on visible light. For example, a type of the high-reflection device may be selected according to actual application requirements, and for example, the high-reflection device may include a silver film or an aluminum film, etc.

For example, by providing the reflecting structure 130 having a high reflectance on a partial region of the second image display region 122, the reflecting structure 130 may reflect more environmental light from a rear side of the vehicle body, and thus the environment in the rear side of the vehicle body may be better observed without enabling the second image display region 122 of the image display device 120. For example, since the partial region of the second display region of the image display device 120 is not covered by the reflecting structure 130, more light emitted by the image display device 120 may be received by eyes of a driver, thereby not only reducing power consumption of the display device 120, but also enabling the driver to better observe environment in the rear side of the vehicle body. For example, the second image display region 122 may be enabled only when a visibility outside the vehicle is low (for example, rain or snow or night), so as to reduce power consumption of the image display device 120.

For example, the display system 100 further includes a third control unit 140, and the third control unit may be configured to make the second image acquiring device 112 and the second image display region 122 be in an operating state after receiving start signal of the second image display region, so as to reduce power consumption of the image display device 120. For example, the third control unit may be a central processor (e.g., an X86 processor, an ARM processor), a programmable logic controller (PLC), a digital signal processor (DSP), or the like.

For example, as illustrated in FIG. 6, in an embodiment of the present disclosure, a signal driving module 150 may further be included, and the signal driving module 150 includes a first signal driving module 151, a second signal driving module 152 and a third signal driving module 153. For example, the first image acquiring device 111 transmits acquired image of a left rear side of the vehicle body to the first signal driving module 151, and the first signal driving module 151 drives the first image display region 121 of the image display device 120 to display the image of the left rear side of the vehicle body; the third image acquiring device 113 transmits acquired image of a right rear side of the vehicle body to the third signal driving module 153, and the third signal driving module 153 drives the third image display region 123 of the image display device 120 to display the image of the right rear side of the vehicle body. The signal driving module 150 (including the first signal driving module 151, the second signal driving module 152 and the third signal driving module 153) may be implemented by hardware, software, firmware, or a combination thereof, for example, may be implemented by a common image signal processing circuit.

For example, in the case of high visibility outside the vehicle (for example, in sunny weather), the second image display region 122 of the image display device 120 is in a standby state, and the driver may observe environment in a rear side of the vehicle body through the reflecting structure 130. In the case of low visibility outside the vehicle (for example, rain or snow or night), the driver may enable the second image acquiring device 112 and the second image display region 122 of the image display device 120 through the third control unit 140, the second image acquiring device 112 transmits acquired image of a front side of the vehicle body to the second signal drive module 152, and the second signal drive module 152 drives the second image display region 122 of the image display device 120 to display the image of a right rear side of the vehicle body.

For example, the first signal driving module 151, the second signal driving module 152, and the third signal driving module 153 may be three independent modules, and each signal driving module 150 is connected with a signal interface of corresponding image display region. For another example, functions of the first signal driving module 151, the second signal driving module 152 and the third signal driving module 153 may be implemented by an integrated signal driving module 150. For example, the integrated signal driving module 150 may control the image display device 120 by regions. For example, the integrated signal driving module 150 may realize pixel-to-pixel input. For another example, the integrated signal driving module 150 may make signals received by the first signal driving module 151, the second signal driving module 152 and the third signal driving module 153 to be respectively transmitted only to the first display region, the second display region and the third display region. For example, the vehicle-mounted system provided by the still another embodiment of the present disclosure make a driver of a vehicle only need to observe an image display device arranged in a position for obtaining information of environment around the vehicle body by integrating functions of the left side rearview mirror and the right side rearview mirror on the image display device arranged in a position of the rearview mirror in the vehicle. And thus, the driver's attention may be prevented from being distracted, and further the driving safety is improved. The vehicle-mounted system provided by the still another embodiment of the present disclosure may be used in conjunction with the dimming system described above, so as to further improve the driving safety.

Another embodiment of the present disclosure provides a vehicle, and the vehicle comprises the vehicle-mounted system described above. The vehicle may be of various types, for example, may be a car, a coach or a truck.

The embodiments of the present disclosure provide a vehicle-mounted system and a vehicle, and the vehicle-mounted system may be applied in driving a vehicle and may improve safety of driving the vehicle.

Although the present disclosure has been described in detail by using general description and specific embodiments, some modifications or improvements may be made on the basis of the embodiments of the present disclosure, which will be obvious to those skilled in the art. Therefore, these modifications and improvements made without departing from the spirit of the present disclosure all fall in the scope of the present disclosure.

What are described above is related to the illustrative embodiments of the disclosure only and not limitative to the scope of the disclosure; the scopes of the disclosure are defined by the accompanying claims.

The application claims priority to the Chinese patent application No. 201710178977.6, filed on Mar. 23, 2017, the entire disclosure of which is incorporated herein by reference as part of the present application.

What is claimed is:

1. A vehicle-mounted system, comprising a vehicle lamp sub-system,
   wherein the vehicle lamp sub-system includes at least one of a direction changer and a light intensity adjuster, a vehicle lamp, and a first controller;
   the vehicle lamp is arranged on a front side of a vehicle body and configured to emit light, and the vehicle lamp includes a left region, a middle region, and a right region;
   the direction changer is arranged on a light emergent side of the vehicle lamp, and configured to change a transmission direction of light that is incident on the direction changer and emitted by the vehicle lamp, and the direction changer is further configured to tilt the light emitted by the vehicle lamp downwards to a front lower side of the vehicle body;
   the light intensity adjuster is configured to adjust intensity of the light emitted by the vehicle lamp; and
   the first controller is configured to control at least one of a transmission direction and intensity of the light emitted by the vehicle lamp by controlling at least one of the direction changer and the light intensity adjuster.

2. The vehicle-mounted system according to claim 1, wherein the direction changer is at least configured to make the light emitted from the left region or the right region of the vehicle lamp respectively irradiate to a left front or a right front of the vehicle body.

3. The vehicle-mounted system according to claim 1, wherein the vehicle lamp includes a first vehicle lamp and a second vehicle lamp;
   the first vehicle lamp is arranged on a left front side of the vehicle body, and includes the left region and a first middle region;
   the second vehicle lamp is arranged on a right front side of the vehicle body, and includes the right region and a second middle region;
   the middle region includes the first middle region and the second middle region;
   the direction changer includes a first direction changer and a second direction changer;
   the first direction changer is arranged on a light emergent side of the first vehicle lamp, and at least configured to change an emergent direction of the light emitted from the left region of the first vehicle lamp, so as to make the light emitted from the left region irradiate to a left front of the vehicle body; and
   the second direction changer is arranged on a light emergent side of the second vehicle lamp, and at least configured to change an emergent direction of the light emitted from the right region of the second vehicle lamp, so as to make the light emitted from the right region irradiate to the right front of the vehicle body.

4. The vehicle-mounted system according to claim 3, wherein
   the first direction changer is further configured to make light emitted from the first middle region of the first vehicle lamp irradiate to a front of the vehicle body or make the light emitted from the first middle region tilt towards a right front side of the vehicle body, and an angle of the light emitted from the first middle region tilting towards the right front side of the vehicle body is less than 2 degrees;
   the second direction changer is further configured to make light emitted from the second middle region of the second vehicle lamp irradiate to a front of the vehicle body or make the light emitted from the second middle region tilt towards a left front side of the vehicle body, and an angle of the light emitted from the second middle region tilting towards the left front side of the vehicle body is less than 2 degrees.

5. The vehicle-mounted system according to claim 1, wherein
   the vehicle lamp includes a front vehicle lamp, the front vehicle lamp being arranged in a middle region of the front side of the vehicle body, and including the left region, the middle region, and the right region;
   the direction changer is at least arranged on light emergent sides of the left region and the right region, and is at least configured to change emergent directions of light emitted from the left region and the right region, so as to make the light emitted from the left region and the right region respectively irradiate to a left front and a right front of the vehicle body.

6. The vehicle-mounted system according to claim 1, wherein
   the vehicle lamp includes a front vehicle lamp, the front vehicle lamp being arranged in a middle region of the front side of the vehicle body, and including the left region, the middle region, and the right region;

the direction changer including a lens, the lens being arranged on a light emergent side of the middle region and configured to collimate light emitted from the middle region, so as to make the light emitted from the middle region irradiate to a front of the vehicle body.

7. The vehicle-mounted system according to claim 1, wherein the vehicle lamp sub-system further includes an image acquiring device and a processing device;
the image acquiring device is arranged on a front side of the vehicle body, and configured to acquire images of other vehicles in front of the vehicle body and in a direction opposite to a moving direction of the vehicle body;
the processing device is configured to determine a distance between the vehicle body and another vehicle in front of the vehicle body and in a direction opposite to a moving direction of the vehicle body according to the images acquired by the image acquiring device, and adjust at least one of an emergent direction and intensity of light emitted by the vehicle lamp by controlling at least one of the direction changer and the light intensity adjuster according to the distance.

8. A vehicle-mounted system, comprising a vehicle lamp sub-system,
wherein the vehicle lamp sub-system includes at least one of a direction changer and a light intensity adjuster, a vehicle lamp, and a vehicle lamp communication system;
the vehicle lamp is arranged on a front side of a vehicle body and configured to emit light;
the direction changer is arranged on a light emergent side of the vehicle lamp, and configured to change a transmission direction of light that is incident on the direction chanter and emitted by the vehicle lamp;
the light intensity adjuster is configured to adjust intensity of the light emitted by the vehicle lamp;
the vehicle lamp communication system includes a signal transmitter and a signal receiver;
the signal transmitter includes a modulator, and the modulator being configured to modulate the vehicle lamp to load information over at least part of the light emitted by the vehicle lamp; and
the signal receiver includes a photoelectric detector and a demodulator, the photoelectric detector being configured to detect light intensity of visible light incident thereon, and the demodulator being configured to acquire information loaded over the light detected by the photoelectric detector.

9. The vehicle-mounted system according to claim 1, wherein
the light intensity adjuster includes light blocking walls arranged in an array and disposed on a light emergent side of the vehicle lamp.

10. A vehicle-mounted system, comprising a vehicle lamp sub-system and a dimming system,
wherein the vehicle lamp sub-system includes at least one of a direction changer and a light intensity adjuster and a vehicle lamp;
the vehicle lamp is arranged on a front side of a vehicle body and configured to emit light;
the direction changer is arranged on a light emergent side of the vehicle lamp, and configured to chance a transmission direction of light that is incident on the direction changer and emitted by the vehicle lamp;
the light intensity adjuster is configured to adjust intensity of the light emitted by the vehicle lamp;
wherein the dimming system includes a first photoelectric sensor and a transparent display panel;
the first photoelectric sensor is arranged on a rear window, and configured to detect light intensity of visible light incident on the first photoelectric sensor; and
the transparent display panel is at least arranged in a partial region of the rear window, and configured to reduce a transmittance of the transparent display panel in a case that the light intensity of the visible light detected by the first photoelectric sensor is greater than a light intensity threshold.

11. The vehicle-mounted system according to claim 10, wherein the transparent display panel is further configured to display at least one of image, text, and symbol information.

12. The vehicle-mounted system according to claim 10, wherein the dimming system further includes a second photoelectric sensor;
the second photoelectric sensor is arranged on a side of the rear window close to an interior of the vehicle body, and configured to detect light intensity of visible light incident from a side of the rear window away from the interior of the vehicle body into the vehicle body through the rear window;
the first photoelectric sensor is arranged on a side of the rear window away from the interior of the vehicle body;
the transparent display panel is configured to determine a transmittance of the transparent display panel according to signal intensity detected by the first photoelectric sensor and signal intensity detected by the second photoelectric sensor.

13. The vehicle-mounted system according to claim 12, wherein the dimming system further includes a second controller;
the second controller is configured to control a transmittance of the transparent display panel based on light intensity of visible light detected by at least one of the first photoelectric sensor and the second photoelectric sensor.

14. The vehicle-mounted system according to claim 1, further comprising a display system, wherein the display system includes an image acquiring device, an image display device, and a reflecting structure;
the image acquiring device includes a first image acquiring device, a second image acquiring device and a third image acquiring device, the first image acquiring device, the second image acquiring device and the third image acquiring device being respectively configured to acquire images of a left rear side, a rear side and a right rear side of the vehicle body;
the image display device is arranged in a position of an interior rearview mirror, and includes a first image display region, a second image display region and a third image display region, and the first image display region, the second image display region and the third image display region are respectively configured to display the images of the left rear side, the rear side and the right rear side of the vehicle body acquired by the first image acquiring device, the second image acquiring device and the third image acquiring device respectively; and
the reflecting structure is arranged in at least a partial region of the second image display region, and configured to at least partially reflect visible light incident on the at least partial region.

15. The vehicle-mounted system according to claim 14, wherein the reflecting structure covers an entire region of the second image display region, and the reflecting structure includes a partially-reflective partially-transmissive device.

16. The vehicle-mounted system according to claim 14, wherein the reflecting structure covers a partial region of the second image display region, and the reflecting structure includes a high-reflection device, the high-reflection having a reflectance of greater than 99% to visible light.

17. The vehicle-mounted system according to claim 14, wherein the display system further includes a third controller;
the third controller is configured to make the second image acquiring device and the second image display region be in an operating state after receiving a start signal of the second image display region.

18. A vehicle, comprising the vehicle-mounted system according to claim 1.

19. The vehicle-mounted system according to claim 10, further comprising a display system, wherein the display system includes an image acquiring device, an image display device, and a reflecting structure;
the image acquiring device includes a first image acquiring device, a second image acquiring device and a third image acquiring device, the first image acquiring device, the second image acquiring device and the third image acquiring device being respectively configured to acquire images of a left rear side, a rear side and a right rear side of the vehicle body;
the image display device is arranged in a position of an interior rearview mirror, and includes a first image display region, a second image display region and a third image display region, and the first image display region, the second image display region and the third image display region are respectively configured to display the images of the left rear side, the rear side and the right rear side of the vehicle body acquired by the first image acquiring device, the second image acquiring device and the third image acquiring device respectively; and
the reflecting structure is arranged in at least a partial region of the second image display region, and configured to at least partially reflect visible light incident on the at least partial region.

20. The vehicle-mounted system according to claim 19, wherein the reflecting structure covers an entire region of the second image display region, and the reflecting structure includes a partially-reflective partially-transmissive device.

\* \* \* \* \*